Figure 1:
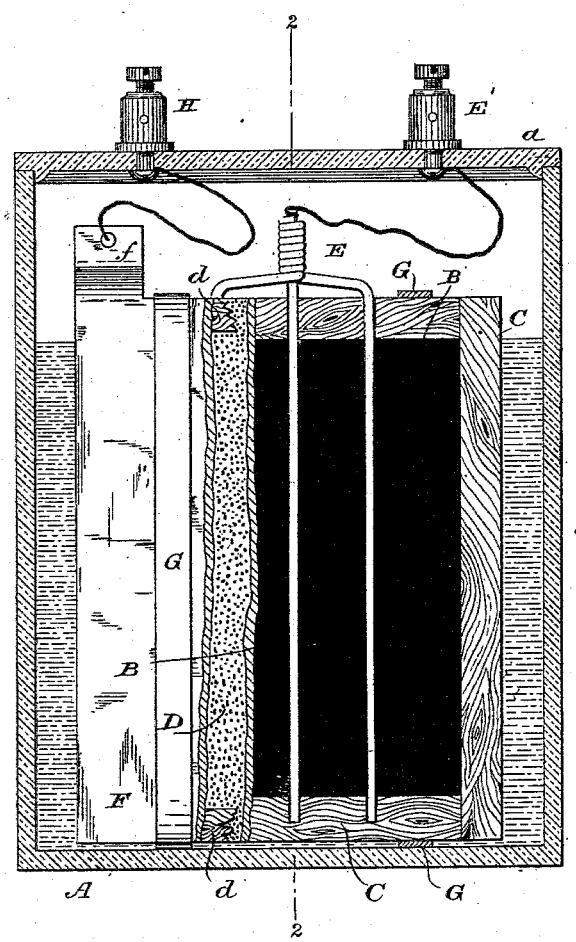

(No Model.)

E. T. STARR.
SECONDARY BATTERY OR ELECTRIC ACCUMULATOR.

No. 281,156. Patented July 10, 1883.

WITNESSES
Wm A. Skinkle
Henry A. Lamb

INVENTOR,
Eli T. Starr,
By his Attorneys
Baldwin, Hopkins & Peyton

UNITED STATES PATENT OFFICE.

ELI T. STARR, OF PHILADELPHIA, PENNSYLVANIA, ASSIGNOR OF ONE-HALF TO H. M. LEWIS AND JAMES W. WHITE, OF SAME PLACE, AND WILLIAM J. PEYTON, OF WASHINGTON, DISTRICT OF COLUMBIA.

SECONDARY BATTERY OR ELECTRIC ACCUMULATOR.

SPECIFICATION forming part of Letters Patent No. 281,156, dated July 10, 1883.

Application filed September 26, 1882. (No model.)

*To all whom it may concern:*

Be it known that I, ELI T. STARR, of the city and county of Philadelphia, in the State of Pennsylvania, have invented certain new and useful Improvements in Secondary Batteries or Electric Accumulators, of which the following is a specification.

My invention relates to the class of electric batteries which, when subjected to the action of an electric current passing through them, become charged or put into condition to give forth electric energy upon connecting their poles with a conductor.

Heretofore secondary batteries have been constructed so as to be "formed" or have the surface of their metallic plates rendered porous by repeated chargings and dischargings thereof. Such is the Planté type of battery. Secondary batteries have also been constructed with positive and negative electrodes or poles formed of pulverized carbon or porous material—such as finely-divided lead—separated by a porous plate or diaphragm. Such is the Percival type of battery. Secondary batteries have also been constructed with metallic plates or supports each coated with a layer of porous active material, such as oxide of lead. Such is the Faure type of battery.

The object of my invention is more especially to improve the construction of secondary batteries or electric accumulators by forming one of its poles or electrodes of a plain sheet or sheets of metal—such as lead—as in Planté's battery, and the other electrode of a mass or conglomerate of porous active material—such as finely-divided lead or oxide of lead—contained within a porous envelope, covering, or casing. The lead plate or plates constitute an efficient positive element when peroxidized upon its surface by the action of the charging-current, while the mass or conglomerate of porous active material constitutes a most efficient negative electrode, due to its largely-increased capacity (over a metal plate or plates of corresponding weight) of absorbing or collecting the hydrogen produced by the decomposition of the electrolytic fluid of the cell, it being a fact that in decomposing said fluid twice as much hydrogen in volume is given off as oxygen. By thus constructing a secondary battery comparative lightness and economy are attained, while the capacity of the battery as an accumulator of electric energy is increased—three very important and desirable ends to be attained in the construction and use of such batteries.

The subject-matter claimed herein is particularly pointed out at the close of the specification.

Some of my improvements may be used without the others, and in ways differing from that particularly shown in the drawings and described herein.

Figure 2:
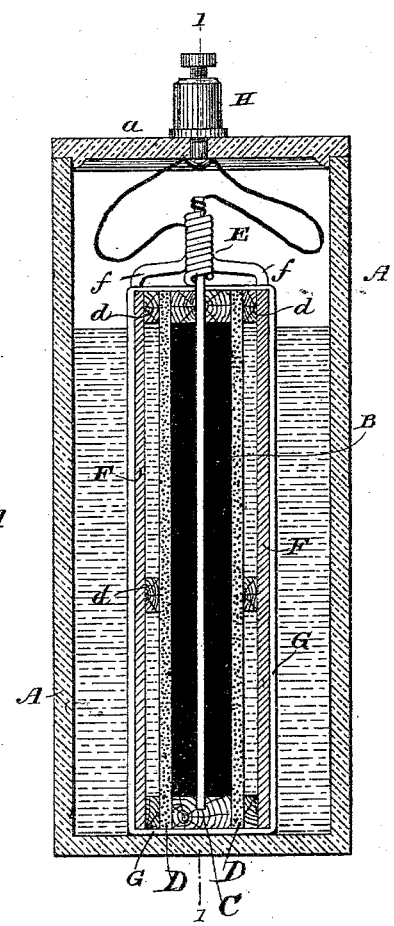

In the accompanying drawings, which illustrate my improvements as embodied in the best way now known to me, Figure 1 is a view in section of the improved battery, showing particularly the recess or chamber for containing the active porous material or conglomerate constituting one electrode of the battery; and Fig. 2 is a section through the battery at right angles to that of Fig. 1, showing the porous plates or partitions at each side of the chamber which holds the porous active material or conglomerate mass constituting one of the electrodes of the battery, the view also showing the plain metal plates at the outside of the porous partitions separated from said partitions and connected together to constitute the other electrode of the battery.

The electrodes of the battery are immersed in acidulated water—for instance, in a vessel or jar, A, which may be of glass, having a detachable cover, *a*. One of said electrodes consists of a mass or conglomerate of active porous material, B—such as finely-divided lead, or an oxide of lead—contained in a preferably non-conducting frame, C, the sides of which are left open, to be closed by porous plates or partitions D D, one at each side, preferably. Said partitions may be of the material commonly used for the porous plates or partitions of galvanic batteries, but are preferably made of carbon. Wires E, of which there may be any desirable number, are embedded in the active porous mass B, so as to constitute a connection between said mass and a binding-post, E', upon the outside of the battery-vessel, said binding-post forming a ready means of connecting one terminal of the chargingline with the porous electrode, or of connecting one end of the wire which is to constitute the working-circuit of the battery. The other electrode of the battery I preferably make up of two plain metallic plates, F F, or lead—for instance, fitted to the flat broad sides of the porous electrode, said plates being separated from the porous plates D D by means of non-conducting strips $d$. Said plates F F are formed in the manner of Planté's elements—that is, are rendered capable of being readily charged by electro-chemical action, due to repeatedly charging and discharging the battery. The plates F F and the porous partitions are preferably held in place upon the porous electrode or its frame C by means of binding strips or bands G G—for instance, of cloth or india-rubber. At one corner of each of the metal plates F an extension, $f$, thereof is formed so as to afford a convenient method of connecting said plates together and to the binding-post H upon the outside of the battery-vessel, said plates constituting one electrode and the porous mass B the other electrode, as before stated.

I have found a battery as thus constructed to be exceedingly effective in accumulating electric energy from a charging-current, while its construction enables it to be economically made and to be comparatively light in weight.

In my improved battery the porous conglomerated electrode may be either the negative or positive pole of the battery. The battery as organized in the present example, however, works better with the conglomerated electrode as the negative element, for the reasons before given. The passage of an electric current through my improved battery strong enough to charge it produces decomposition in the cell and converts the positive electrode into the oxygen pole and the negative electrode into the hydrogen-pole, as usual in the operation of secondary batteries.

Various changes may be made in the structure of the battery without departing from my invention. For instance, but one metal plate to constitute one of the electrodes may be used instead of two or more, and it may be flat, or bent so as to surround the porous electrode. In place of the porous plates D D, cloth or other material may be stretched across the open side or sides of the frame C. In place of the stiff frame C to inclose a flat mass of the porous active material, a mass of such material may be inclosed in a bag or covering of flannel, felt, or some such material in which a wire or wires are embedded. Other obvious changes may be made. I prefer, however, the construction which I have particularly shown and described. If an oxide of lead or finely-divided lead is used as the porous active material, I prefer the conducting wire or wires E of that electrode to be of lead.

By a "plain" battery plate or plates in this specification, I mean a plate or plates unprovided in the original construction of the battery with a layer of porous active material, as in the so-called "Faure" form of battery.

Before reciting what I claim herein, I would have it understood that this is a division of my application filed June 2, 1882, in favor of which I disclaim all the patentable subject-matter of my invention save that particularly recited in the following claims. Other divisions of my said original application will be filed with claims to the patentable matter of my invention not specifically covered in this division, or in the patent granted to me November 21, 1882, on said original application.

I claim herein as of my invention—

1. An electrode for secondary batteries, consisting of a porous mass or conglomorate, a non-conducting open-sided skeleton frame surrounding the edges of said mass to support and protect it, and one or more conducting strips or wires embedded in said mass and ramifying therein as a conducting-connection, substantially as described.

2. An electrode for secondary batteries, consisting of a porous mass or conglomerate supported and protected at its edges by a non-conducting open-sided skeleton frame and at its opposite sides by porous plates or partitions fitted to the sides of said frame, with a conducting-connection in contact with said mass, substantially as described.

3. The combination, substantially as hereinbefore set forth, of the porous conglomerate electrode, the skeleton frame or covering for said electrode, the metal-plate electrode, and the connection fastening said metal-plate electrode to said frame or covering, whereby an efficient secondary-battery couple is provided readily portable without separation of its parts and irrespective of a battery-vessel.

In testimony whereof I have hereunto subscribed my name.

ELI T. STARR.

Witnesses:
Wm. J. Peyton,
W. R. Potter.